(12) United States Patent
Vroemen

(10) Patent No.: US 11,293,501 B2
(45) Date of Patent: Apr. 5, 2022

(54) POWERTRAIN FOR A VEHICLE AND METHOD FOR CONTROLLING A POWERTRAIN IN A VEHICLE

(71) Applicant: Punch Powertrain N.V., Sint-Truiden (BE)

(72) Inventor: Bas Gerard Vroemen, Eindhoven (BE)

(73) Assignee: Punch Powertrain PSA E-Transmissions N. V., Sint-Truiden (BE)

( * ) Notice: Subject to any disclaimer, the term of this patent is extended or adjusted under 35 U.S.C. 154(b) by 0 days.

(21) Appl. No.: 17/058,475

(22) PCT Filed: May 27, 2019

(86) PCT No.: PCT/EP2019/063622
§ 371 (c)(1),
(2) Date: Nov. 24, 2020

(87) PCT Pub. No.: WO2019/224394
PCT Pub. Date: Nov. 28, 2019

(65) Prior Publication Data
US 2021/0199164 A1    Jul. 1, 2021

(30) Foreign Application Priority Data

May 25, 2018   (BE) .................................. 2018/5341

(51) Int. Cl.
*F16D 48/10*    (2006.01)
*B60W 10/02*    (2006.01)
(Continued)

(52) U.S. Cl.
CPC ............. *F16D 48/10* (2013.01); *B60W 10/02* (2013.01); *B60W 10/08* (2013.01);
(Continued)

(58) Field of Classification Search
CPC ........... F16D 48/10; F16D 2500/10412; F16D 2500/30406; F16D 2500/30407;
(Continued)

(56) References Cited

U.S. PATENT DOCUMENTS

| 5,627,750 A | 5/1997 | Kono et al. |
| 6,625,536 B1 * | 9/2003 | Vohmann .......... B60W 30/1819 |
| | | 701/67 |

(Continued)

FOREIGN PATENT DOCUMENTS

| AT | 517108 B1 * | 11/2016 | ............. F16D 48/06 |
| CN | 103890435 A * | 6/2014 | ............... B60K 6/48 |

(Continued)

OTHER PUBLICATIONS

Jun. 28, 2019, International Search Report and Written Opinion, PCT/EP2019/063622.

*Primary Examiner* — Tisha D Lewis
(74) *Attorney, Agent, or Firm* — Banner & Witcoff, Ltd.

(57) ABSTRACT

A powertrain for a vehicle is disclosed that includes an electromagnetic driving unit (10) and a transmission module (20) having a controllable clutch (21) the powertrain further includes a control system to control the electromagnetic driving unit and to control the clutch. The controller has a safety operational mode wherein it controls an engagement of the controllable clutch with a feedback loop in which a desired extent of engagement is positively correlated to a difference between an extent of slip as indicated by the slip indicator and a positive reference value for the extent of slip, wherein the slip indicator indicates the extent of slip with a sign that is the product of the sign of the difference between the rotational speed of the input shaft and a rotational speed of the output shaft and a desired driving torque sign.

20 Claims, 4 Drawing Sheets

(51) Int. Cl.
  *B60W 10/08*     (2006.01)
  *B60W 40/105*    (2012.01)

(52) U.S. Cl.
  CPC . *B60W 40/105* (2013.01); *F16D 2500/10412* (2013.01); *F16D 2500/30406* (2013.01); *F16D 2500/30415* (2013.01); *F16D 2500/30421* (2013.01); *F16D 2500/30426* (2013.01); *F16D 2500/3109* (2013.01); *F16D 2500/50858* (2013.01); *F16D 2500/5102* (2013.01); *F16D 2500/7061* (2013.01)

(58) Field of Classification Search
  CPC . F16D 2500/30421; F16D 2500/30426; F16D 2500/3109; F16D 2500/50858; F16D 2500/5102; F16D 2500/7061; B60W 10/02; B60W 10/08; B60W 40/105
  See application file for complete search history.

(56) References Cited

U.S. PATENT DOCUMENTS

| | | | | |
|---|---|---|---|---|
| 7,228,216 | B2 * | 6/2007 | Inoue | F16D 48/06 192/48.2 |
| 2013/0178330 | A1 * | 7/2013 | Nefcy | F16D 48/06 477/5 |
| 2016/0167655 | A1 * | 6/2016 | Minami | B60W 30/188 477/176 |

FOREIGN PATENT DOCUMENTS

| | | | | |
|---|---|---|---|---|
| DE | 19952352 | A1 | 5/2001 | |
| DE | 102010033836 | A1 | 3/2011 | |
| DE | 102016219793 | B3 | 2/2018 | |
| EP | 1460317 | A2 | 9/2004 | |
| GB | 2536279 | A * | 9/2016 | ........... F16D 48/062 |
| WO | WO-2012056855 | A1 * | 5/2012 | ............... B60K 6/46 |

\* cited by examiner

US 11,293,501 B2

POWERTRAIN FOR A VEHICLE AND METHOD FOR CONTROLLING A POWERTRAIN IN A VEHICLE

CROSS-REFERENCE TO RELATED APPLICATIONS

This application is a U.S. National Stage application under 35 U.S.C. § 371 of International Application PCT/EP2019/063622 (published as WO 2019/224394 A1), filed May 27, 2019, which claims the benefit of priority to Application BE 2018/5341, filed May 25, 2018. Benefit of the filing date of these prior applications is hereby claimed. Each of these prior applications is hereby incorporated by reference in its entirety.

The present invention pertains to a powertrain for a vehicle.

The present invention further pertains to method for controlling a powertrain in a vehicle.

BACKGROUND

In hybrid or electrically driven vehicles typically a brushless electromotor is applied to propel the vehicle. The rotation direction thereof fully relies on the controller that provides the drive signals to drive the electromotor. It is of utmost importance and usually a legal requirement that the rotation direction corresponds is indeed the rotation direction that is required to achieve the desired driving direction to guarantee a predictable behavior of the vehicle. Although various measures are taken to avoid that this occurs, it is desired to further reduce this risk.

SUMMARY

It is an object of the present invention to provide a powertrain for a vehicle that reduces the risk of such an unpredictable behavior.

It is a further object of the present invention to provide a method for controlling a powertrain for a vehicle that reduces the risk of such an unpredictable behavior.

According to the first object a powertrain is provided as claimed in claim 1. When operating in its safety mode, it controls an engagement of the controllable clutch with a feedback loop in which a desired extent of engagement as specified by the clutch control signal is positively correlated to a difference between an extent of slip as indicated by the slip indicator and a positive reference value for said extent of slip. Accordingly, in the normal situation, wherein the rotation direction of the electromotor corresponds to the rotation direction that is required to achieve the desired driving direction, the controller maintains the controllable clutch in a state wherein it transmits a torque driving the vehicle in the desired direction with the output of the controllable clutch rotating at a rotational velocity that is less than a rotational velocity at its input as determined by the positive reference value.

Should however a situation occur wherein the electromotor inadvertently rotates in the inverse direction, the difference between the input rotational velocity and the output rotational value is negative. Consequently, also the error signal, as determined by the difference between the extent of slip as indicated by the slip indicator and the positive reference value is negative. As the desired extent of engagement as specified by the clutch control signal is positively correlated to the error signal, the clutch is forced into a disengagement. As a result of the disengagement it is prevented that the electromotor can cause a propulsion if the vehicle in a reverse direction, even if it inadvertently rotates reversely. As the disengagement of the controllable clutch prevents a propulsion of the vehicle, the error signal will remain negative so that the clutch is indeed maintained stably in its disengaged state as long as the electromotor remains in its inversely rotation state.

In this manner it is achieved that a risk of unpredictable behavior of the vehicle is mitigated. The measure may be combined with a further safety measure that monitors the rotation direction of the electromotor and that disables operation of the electromotor in case it is detected that the rotation direction does not correspond to the rotation direction that is required to achieve the desired driving direction. In this manner two independent safety measures are provided that in combination even more reduce the risk of unpredictable vehicle behavior.

Accordingly, in the normal situation, wherein the rotation direction of the electromotor corresponds to the rotation direction that is required to achieve the desired driving direction, the controller maintains the controllable clutch in a state wherein it transmits a torque driving the vehicle in the desired direction with the output of the controllable clutch rotating at a rotational velocity that is less than a rotational velocity at its input as determined by the positive reference value.

Should however a situation occur wherein the electromotor inadvertently rotates in the inverse direction, the difference between the input rotational velocity and the output rotational value is negative. Consequently, also the error signal, as determined by the difference between the extent of slip as indicated by the slip indicator and the positive reference value is negative. As the desired extent of engagement as specified by the clutch control signal is positively correlated to the error signal, the clutch is forced into a disengagement. As a result of the disengagement it is prevented that the electromotor can cause a propulsion if the vehicle in a reverse direction, even if it inadvertently rotates reversely. As the disengagement of the controllable clutch prevents a propulsion of the vehicle, the error signal will remain negative so that the clutch is indeed maintained stably in its disengaged state as long as the electromotor remains in its inversely rotation state.

The present disclosure further provides a method of operating a powertrain according to claim 10, and a computer program product according to claim 15.

BRIEF DESCRIPTION OF THE DRAWINGS

These and other aspects are described in more detail with reference to the drawing. Therein.

DETAILED DESCRIPTION OF EMBODIMENTS

Figure 1:
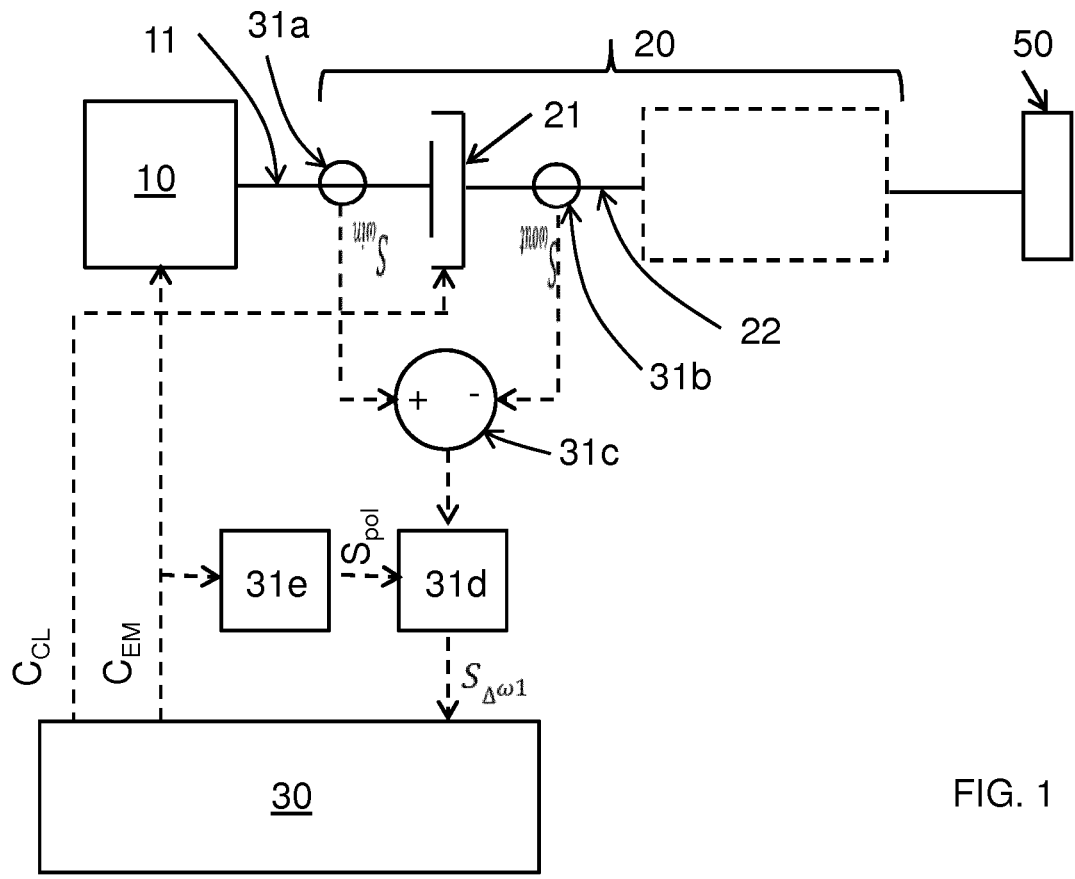
FIG. 1 schematically shows an embodiment of a powertrain for a vehicle.

FIG. 1 schematically shows a powertrain for a vehicle including at least an electromagnetic driving unit 10 with output shaft 11 and a transmission module 20 to transmit mechanical energy from the electromagnetic driving unit 10 to wheels 50 of the vehicle. The electromagnetic driving unit 10 is to generate mechanical energy by rotating the driving shaft 11 with a first rotational speed $\omega_{in}$ while exerting a driving torque $T_{driv}$. The electromagnetic driving unit 10 may comprise an electromotor and optional transmission elements like a fixed gear. The electromagnetic driving unit 10 may further include a control unit that drives the electromotor. The transmission module 20 is to transmit the mechanical energy from the driving shaft 11 to wheels 50 of the vehicle. The transmission module 20 at least comprises a controllable clutch 21 to controllably couple the driving shaft 11 with the output shaft 22. It is noted that the wording shaft is not restricted to refer to a solid axis, but to any other member that is capable of rotating, for example drum. Shafts may enclose other shafts, for example a drum may be rotatably arranged around another drum, which on its turn is rotatably arranged around a solid axis. The powertrain further includes a control system comprising a controller 30 to control a desired rotational speed and desired driving torque of the electromagnetic driving unit with a drive control signal $C_{EM}$. The desired driving torque has a desired driving torque sign. The desired driving torque sign is denoted as positive if the electromagnetic driving unit 10 is to accelerate the vehicle in the desired driving direction and is negative otherwise. For example, if the desired driving direction is the forward direction of the vehicle is positive if the electromagnetic driving unit 10, when correctly exerting this desired driving torque tends to increase a speed of the vehicle in that forward direction. For example if the vehicle is actually driving backwards on a slanting road portion the electromagnetic driving unit 10 should tend to reduce the velocity in the backwards direction and subsequently to accelerate the vehicle in the forward direction.

Figure 1A:
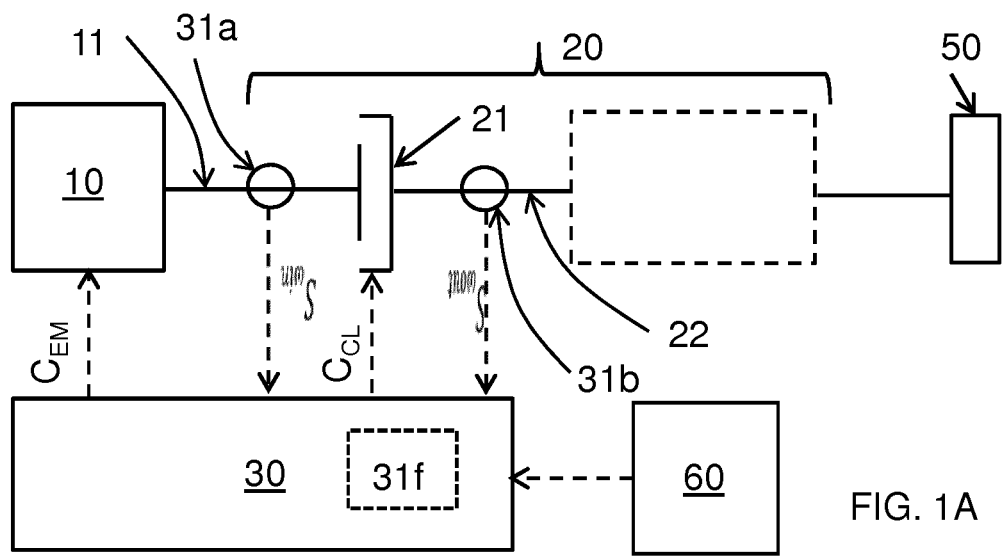
FIG. 1A schematically shows a further embodiment of a powertrain for a vehicle.

The controller 30 is further provided to control the controllable clutch with a clutch control signal $C_{CL}$. The clutch control signal specifies a desired extent of engagement to be provided by the clutch 21 between the driving shaft 11 and its output shaft 22. The transmission module 20 may comprise other transmission elements, like a gear, to define a transmission ratio in a stepwise or in a continuous manner, a torque converter, a fixed transmission and a differential. Also other motors may be included, for example a combustion engine in a hybrid arrangement and an auxiliary electromotor to start the combustion engine. In the embodiment shown, a clutch slip indicator 31a, 31b, 31c is to provide a signal $S_{\Delta\omega}$ indicative for an extent of slip between the driving shaft 11 and the output shaft 22 of the controllable clutch. The extent of slip as indicated by the signal $S_{\Delta\omega}$ may for example be a difference $\omega_{in}-\omega_{out}$ between the first rotational speed $\omega_{in}$ and a second rotational speed $\omega_{out}$ with which the output shaft 22 rotates. Alternatively the extent of slip as indicated may be another function of the rotational speeds $\omega_{in}-\omega_{out}$ of the driving shaft 11 and the output shaft 22, for example a ratio defined as $\omega_{in}/\omega_{out}$, or a logarithmic value of this ratio. In the embodiment shown, the clutch slip indicator includes a first rotational speed sensor 31a attached to the fixed world to measure the rotational speed $\omega_{in}$ of the driving shaft 11, a second rotational speed sensor 31b, also attached to the fixed world to measure the rotational speed $\omega_{out}$ of the output shaft 22, and a comparator 31c to compute a value of the extent of slip to be indicated by the signal $S_{\Delta\omega}$. Alternatively, a single rotational speed detector may be provided that is attached to one of the shafts and that measures the rotational speed of the other one of the shafts relative to the rotational speed of the shaft to which it is attached. Such an alternative sensor may for example indicate the extent of slip as by a value proportional to the measured relative rotational speed or a logarithmic value thereof. In the embodiment shown, the slip indicator further includes a selective invertor element 31d that selectively inverts an output signal of the comparator 31c in response to a polarity control signal $S_{pol}$ from polarity indicator 31e. Therewith, the extent of slip is indicated with a sign that is the product of the sign of the difference between the rotational speed of the input shaft and a rotational speed of the output shaft and the desired driving torque sign;

The controller 30 is arranged to assume a safety operational mode, wherein it controls an engagement of the controllable clutch 21 with a feedback loop in which a desired extent of engagement as specified by the clutch control signal $C_{CL}$ is positively correlated to a difference between an extent of slip as indicated $S_{\Delta\omega}$ by the slip indicator and a positive reference value for said extent of slip. Therein the slip indicator indicates the extent of slip with a sign that is the product of the sign of the difference between the rotational speed of the input shaft and a rotational speed of the output shaft and the desired driving torque sign. In the embodiment shown this is achieved in that the polarity indicator 31e determines the desired driving torque sign from the desired driving torque as specified by control signal $C_{EM}$. Alternatively the controller 30 may provide an output signal that directly controls the selective invertor element 31d. Also one or more elements of the slip indicator may be integrated in the controller 30, This is schematically indicated in FIG. 1A, as controller 30 having a module 31f.

When driving a vehicle, a desired change may be one of the following:
a) The vehicle should accelerate its motion in the direction corresponding to the selected gear.
b) The vehicle should decelerate its motion in the direction corresponding to the selected gear.

In case a) the driver may have selected a forward direction for example by selecting the setting "D" in a continuous transmission system, or a setting "1-6" for example in a stepwise controllable transmission system. Alternatively, the driver may have selected a backward direction for example by selecting the setting "R" in a continuous transmission system, or in a stepwise controllable transmission system. By pressing the speed pedal the driver indicates an intention to accelerate in the selected direction, which corresponds to a positive driving torque sign.

With the clutch in a slipping operational mode, the first rotational speed $\omega_{in}$ is greater than the second rotational speed $\omega_{out}$ in a normal operating conditions of the electromagnetic driving unit 10. It is also conceivable that the driver intends to accelerate in the selected forward direction while the vehicle is (slowly) driving backwards. In that case the rotational speed $\omega_{out}$ of the output shaft has a negative value, and the rotational speed $\omega_{in}$ of the driving shaft 11 has a value which is preferably a positive value, but at least greater than or equal to said negative value. The slip indicator indicates the extent of slip with a sign that is the product of the sign of the difference between the rotational speed of the input shaft and a rotational speed of the output shaft and the desired driving torque sign. Hence, in any of these cases the slip indicator indicates the extent of slip with a positive sign. In each of these cases, a tendency of the slip to increase above the reference value would be counteracted by an increased engagement of the controllable clutch, while a tendency of the slip to decrease below the reference value would be counteracted by an decreased engagement of the controllable clutch.

Should it be the case that inadvertently an error occurs in the electromagnetic driving unit 10 that causes the electromagnetic driving unit 10 to exert a torque in a direction reverse to the torque that should be exerted in normal operation, this would have the effect that with the clutch in a slipping operational mode, the first rotational speed $\omega_{in}$ is less than the second rotational speed $\omega_{out}$. In that case, the value of the slip is negative, i.e. the value of the slip is always lower than the reference value. As a result the controllable clutch is disengaged, resulting in an even more negative slip value. This process ends in a full disengagement of the controllable clutch therewith avoiding unexpected braking of the vehicle due to an inadvertent malfunctioning of the electromagnetic driving unit.

The driver may indicate an intended deceleration by releasing the speed pedal and/or by pressing the break pedal. In that case the driving torque sign is negative. As a result, the slip indicator indicates the extent of slip with a sign that is the inverse of the sign of the difference between the rotational speed of the input shaft and a rotational speed of the output shaft. With the clutch in a slipping operational mode, the first rotational speed $\omega_{in}$ is less than the second rotational speed $\omega_{out}$ in a normal operating conditions of the electromagnetic driving unit 10. As the slip indicator inverts the sign of the measured slip, the feedback loop active in the safety operational mode will tend to maintain a desired extent of engagement of the controllable clutch wherein the first rotational speed $\omega_{in}$ is equal to the second rotational speed $\omega_{out}$ minus the positive reference value.

Should it be the case that inadvertently an error occurs in the electromagnetic driving unit 10 that causes the electromagnetic driving unit 10 to exert a torque in a direction reverse to the torque that should be exerted in normal operation, this would have the effect that with the clutch in a slipping operational mode, the first rotational speed $\omega_{in}$ is greater than the second rotational speed $\omega_{out}$. In that case, the inverted value, as indicated by the slip indicator is negative, and therewith always lower than the reference value. As a result the controllable clutch is disengaged, resulting in an even more negative slip value. This process ends in a full disengagement of the controllable clutch therewith avoiding unexpected braking of the vehicle due to an inadvertent malfunctioning of the electromagnetic driving unit.

Figure 2:
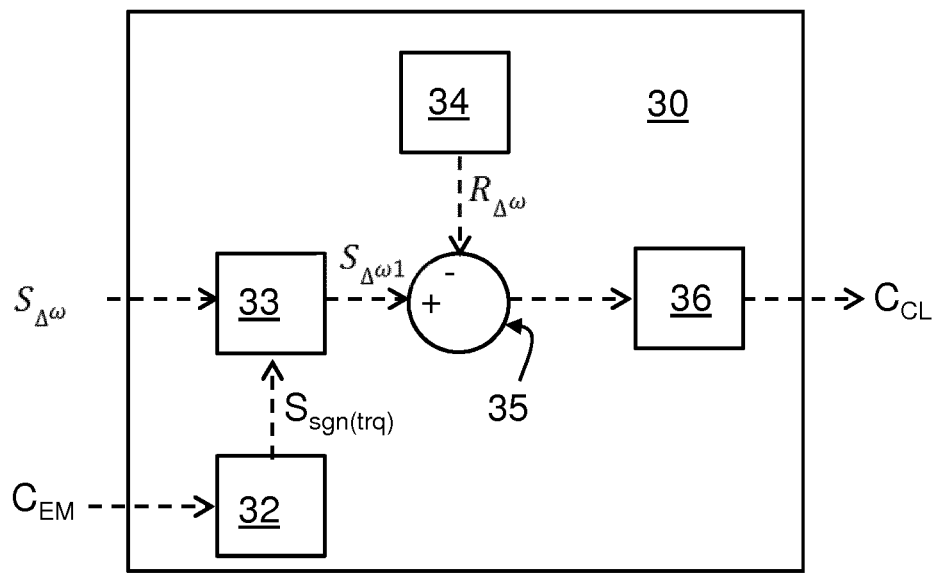
FIG. 2 shows in more detail an embodiment of a controller for use in a powertrain.

An embodiment of a controller 30 is depicted in FIG. 2. It is presumed that the controller 30 receives a control signal $C_{EM}$, indicative for a desired rotational speed and a desired driving torque of the electromagnetic driving unit 10 (FIG. 1) from an external control unit, for example a conventional control unit for this purpose. The controller also receives a signal $S_{\Delta\omega}$ indicative for an extent of slip of the controllable clutch 21 (FIG. 1) for example be a difference $\omega_{in}-\omega_{out}$ between the first rotational speed $\omega_{in}$ and a second rotational speed $\omega_{out}$ with which the output shaft 22 rotates. Alternatively the controller 30 may have a means to calculate the signal $S_{\Delta\omega}$ indicative for an extent of slip. The controller 30 has a torque sign indicator 32 to provide a signal $S_{sgn(trq)}$ indicative of a sign of the desired torque. The controller 30 further has a controllable inverter 33 to selectively invert a sign of the extend of slip as indicated by signal $S_{\Delta\omega}$. I.e. if the desired torque is positive, corresponding to an acceleration of the vehicle in the selected direction, the sign of the slip signal is remains the same. However, if the desired torque is negative, corresponding to an deceleration of the vehicle in the selected direction, then the sign of the slip signal is inverted. The subtraction element 35 subtracts a positive reference value from the value as indicated by the controllable inverter 33 and provides this as the error signal to drive unit 36 that provides the drive signal $C_{CL}$ for the controllable clutch 21. The drive unit 36 may typically have a proportional response, but may additionally have an integrating or differentiating component for fine tuning the response.

Figure 3:
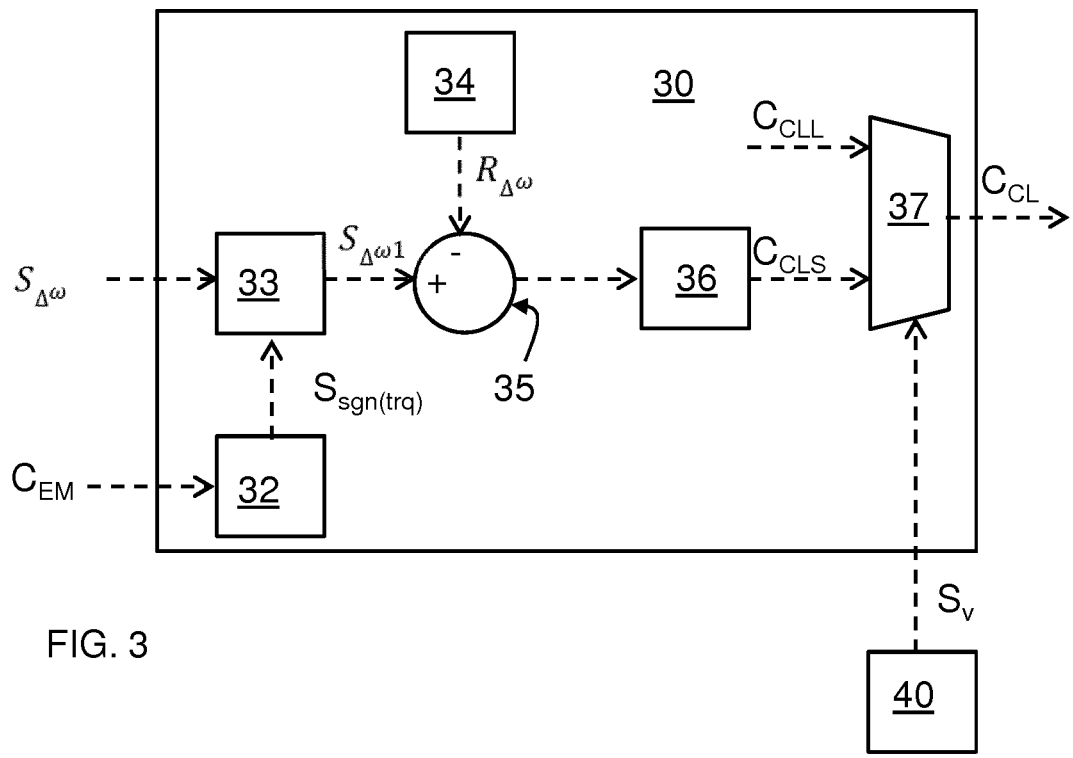
FIG. 3 shows in more detail another embodiment of a controller for use in a powertrain.

In order to enable a more efficient operation if the risk of occurrence of a malfunctioning electromagnetic driving unit is already with acceptable bounds, the controller 30 may be configured to selectively assume the safety operational mode upon compliance of at least one enablement condition. An embodiment of such a controller is shown in FIG. 3. The controller 30 shown therein has a selection element 37, that dependent on input signal Sv, selects a drive signal $C_{CLS}$ from drive unit 36 or a further drive signal $C_{CLL}$ as the output signal $C_{CL}$. The further drive signal $C_{CLL}$ may be a drive signal that forces the controllable clutch 21 into a locked operational mode. The selection element 37 may alternatively be arranged between the subtraction element 35 and the drive unit 36, so that it selectively transmits the error signal provided by the selection element to the input of the drive unit or another control signal. The selection of the selection element 37 is determined by a signal indicative Sv for a speed of the vehicle provided by speed indicator 40. The at least one enablement condition is an indication from the speed indicator 40 that an absolute value of the speed of the vehicle is less than or equal to a speed threshold value. Therewith the controller 30 selectively assumes the safety operational mode at a relatively low speed of the vehicle. This is based on the consideration that the risk of a coming into existence of a malfunction of the electromagnetic driving unit 10 is the highest in the situation wherein the electromagnetic driving unit 10 is activated (again). This is typically the case if the driver intends to accelerate the vehicle from standstill. Once it is established that the electromagnetic driving unit 10 is correctly functioning, when the vehicle is accelerated to some extent, e.g. to a speed of at least 5 km/h or 10 km/h for example the safety operational mode may be deactivated. Hence although the safety operational mode incurs some transmission losses, due to its selective activation at low speeds of the vehicle, the overall amount of these losses is very modest.

Figure 4:
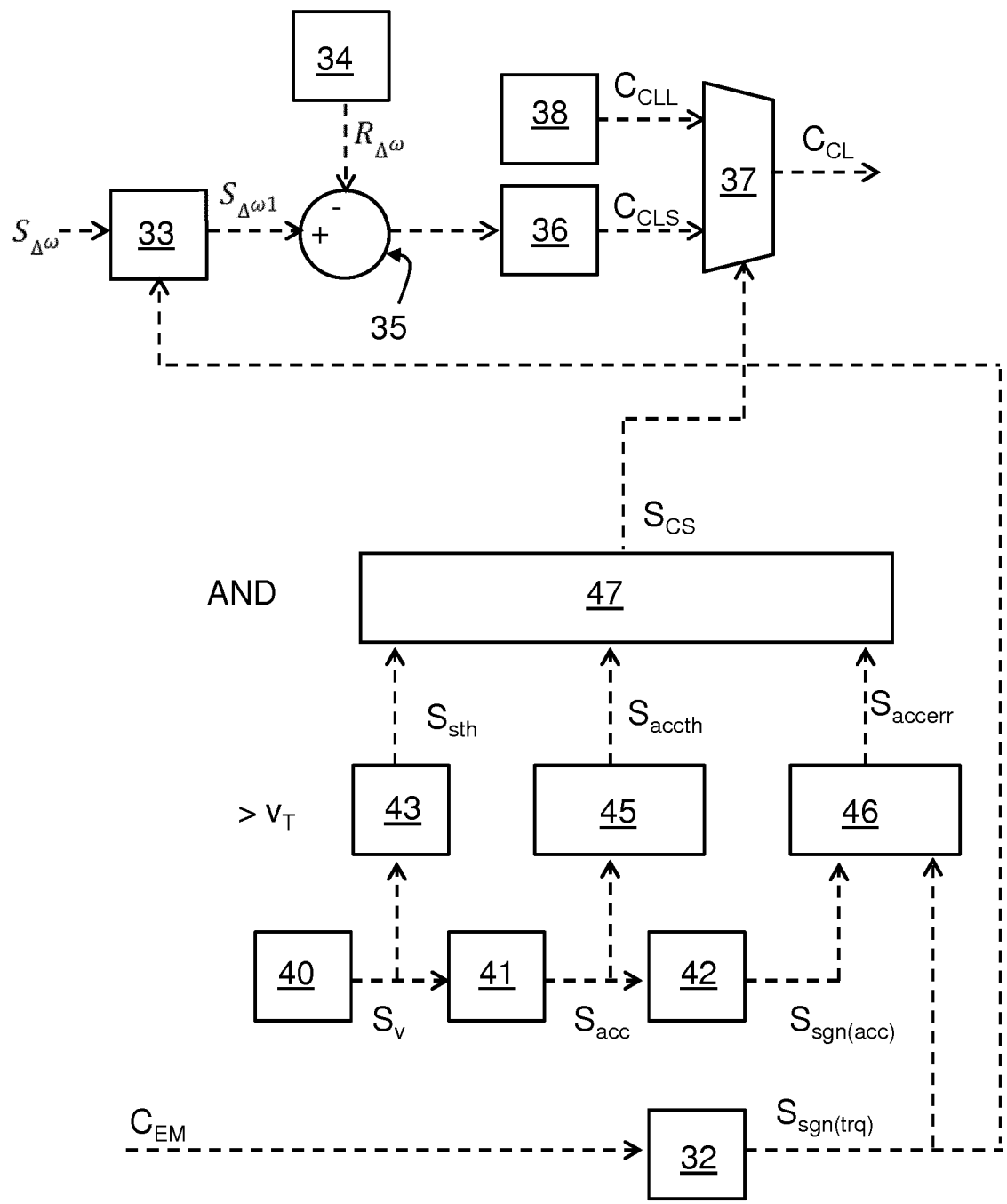
FIG. 4 shows in more detail a further embodiment of a controller for use in a powertrain.

In a further embodiment, as shown in FIG. 4, the vehicle comprises an acceleration indicator 41, 42 to provide a signal $S_{acc}$ indicative for a measured acceleration of the vehicle. The at least one enablement condition is an indication Saccerr provided by comparison element 46 that a sign of the acceleration as indicated $S_{sng(acc)}$ by the acceleration indicator 41,42 is inverse to an intended sign of the acceleration $S_{sgn(trq)}$ as derived from the control signal $C_{EM}$. In the embodiment shown the acceleration indicator 41, 42, may indicate the measured acceleration of the vehicle by derivation of the speed of the vehicle as indicated by speed indicator 40. Alternatively an inertial sensor may be provided to render the signal $S_{acc}$ indicative for the measured acceleration. The occurrence of a measured acceleration inverse to an intended acceleration is a strong indicator of an error condition that justifies the safety operational mode. To avoid a too abrupt selection of the safety operational mode, for example due to a temporary deceleration of the vehicle in a slanting portion of the road, additional conditions may be required to be complied with. In the embodiment shown, these are the additional condition that the acceleration indicator indicates that a magnitude of the acceleration exceeds a threshold magnitude. This condition is determined by threshold element 45. In the embodiment shown the threshold magnitude is dependent on the sign of the acceleration as indicated by the acceleration indicator. In particular, the threshold magnitude for a positive sign of the acceleration is greater than a threshold magnitude for a negative sign of the acceleration. By way of example the threshold element 45 may indicate compliance of the additional condition if the measured vehicle acceleration is less than −2 m/s$^2$ or exceeds 1.5 m/s$^2$.

As a still further additional condition for entering the safety operational mode it may be required that the speed indicator 40 indicates that an absolute value of the speed of the vehicle is greater than or equal to a further speed threshold value. This condition is verified by a further threshold element 43. The further threshold element may indicate that this condition is complied with, for example if the measured speed as indicated by the signal SV exceeds the further threshold value, e.g. a value of 30 km/h or 50 km/h.

In the embodiment of FIG. 4, the safety operational mode is enabled by signal $S_{CS}$ if the logical gate 47, determines that each of the enablement conditions is complied with.

Figure 5:
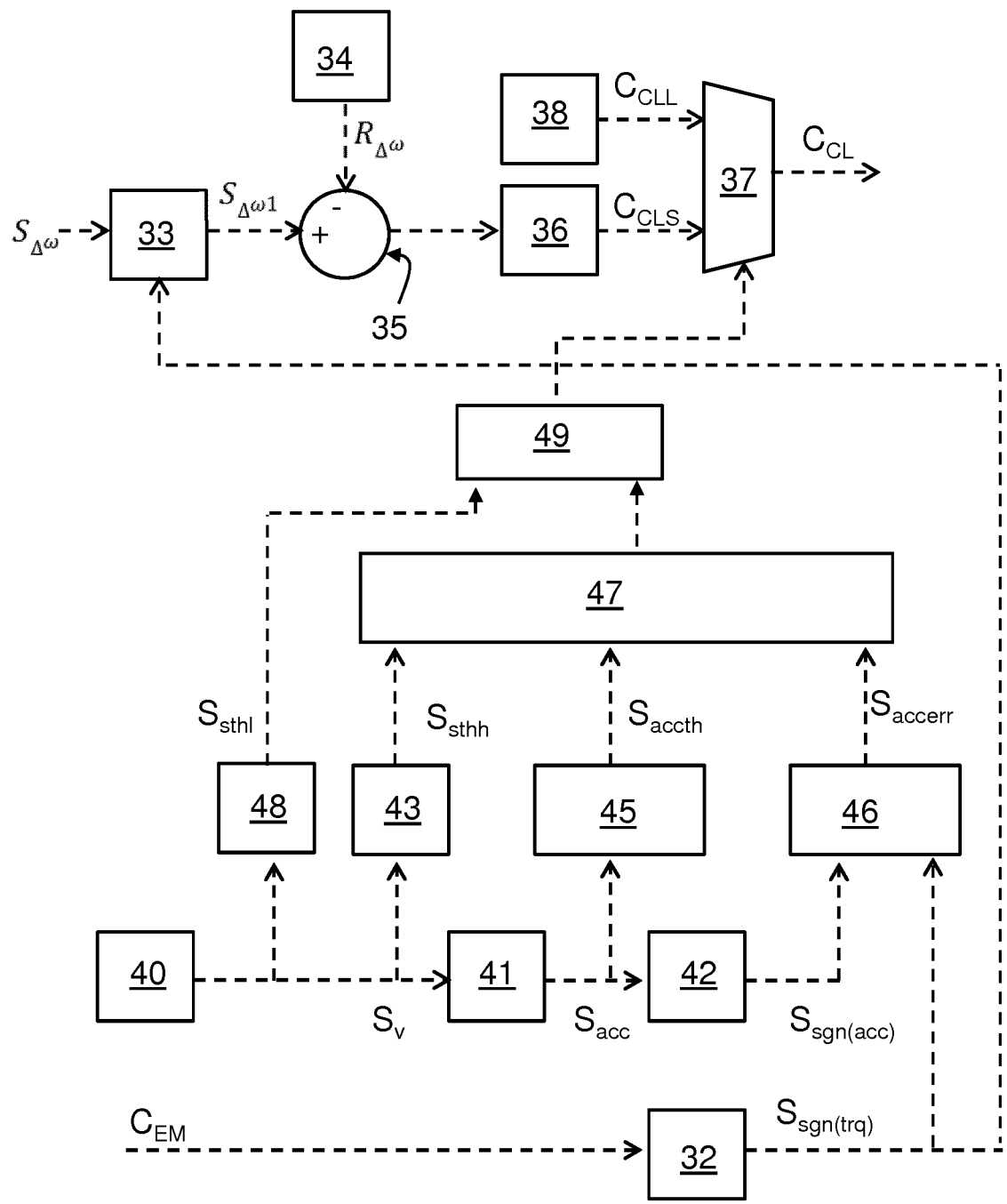
FIG. 5 shows in more detail a still further embodiment of a controller for use in a powertrain.

FIG. 5 shows a further embodiment. Elements therein corresponding to those of FIG. 4 have a corresponding reference. Therein the selection signal $S_{CS}$ is provided by a logic element 49 that determines that at least one of the following (sets of) conditions is complied with.
a) The measured speed of the vehicle as indicated by signal Sv is less than a lower threshold value, e.g. 10 km/h. This condition is verified by first threshold element 48 and signaled by signal $S_{sth1}$ to the logic element 49.
b)
b1) The measured speed of the is greater than a higher threshold value, e.g. 30 km/h.
AND
b2) The sign of the measured acceleration is inverse to the sign of the intended acceleration.
AND
b3) The magnitude of the acceleration exceeds a threshold value.

In the embodiment of FIG. 5, a selection of the safety operational mode is normally avoided. However, the safety operational mode is enabled in situations where the a priori probability of a malfunctioning of the electromagnetic driving unit is higher than an average probability and the safety operational mode is also enabled in situations wherein a behavior of the vehicle is indicative of a malfunctioning.

In operation a method of operating a powertrain for a vehicle is executed. The powertrain to be operated includes at least an electromagnetic driving unit 10 (FIG. 1,2) to generate mechanical energy by rotating a driving shaft 11 with a first rotational speed $\omega_{in}$ while exerting a driving torque $T_{driv}$. A transmission module 20 is to transmit mechanical energy from the driving shaft 11 to wheels 50 of the vehicle. The transmission module 20 at least comprises a controllable clutch 21 to controllably couple an output shaft 22 with the driving shaft 11. The method includes a safety operational mode, comprising:

controlling a desired rotational speed and desired driving torque of the electromagnetic driving unit 10 with a drive control signal $C_{EM}$, the desired driving torque having a desired driving torque sign;

controlling the clutch 21 with a clutch control signal $S_{CL}$ specifying a desired extent of engagement to be provided by the clutch between the driving shaft 10 and its output shaft 22, providing a signal $S_{\Delta\omega1}$ indicative for an extent of slip between the driving shaft 11 and the output shaft 22, the extent of slip being indicated with a sign that is the product of the sign of the difference between the rotational speed of the input shaft and a rotational speed of the output shaft and the desired driving torque sign;

controlling an engagement of the controllable clutch with a feedback loop in which a desired extent of engagement as specified by the clutch control signal $C_{CL}$ is positively correlated to a difference between the indicated extent of slip and a positive reference value for said extent of slip.

It is noted that various computational elements are involved. As will be apparent to a person skilled in the art, such elements, as listed in the apparatus claims and presented in the detailed description are meant to include any hardware (such as separate or integrated circuits or electronic elements) or software (such as programs or parts of programs) which reproduce in operation or are designed to reproduce a specified function, be it solely or in conjunction with other functions, be it in isolation or in co-operation with other elements. The invention can be implemented by means of hardware comprising several distinct elements, and by means of a suitably programmed computer. Alternatively, various elements presented in the application as mutually distinct may be provided by a single computational resource. A computational resource, for example a controller 30 may be a programmable resource, for example a dedicated signal processor or a general purpose processor, which retrieves instructions from a computer program product. A computer program product, is to be understood to mean a computer readable medium, e.g. a flash-memory, a hard-disk or other non-volatile medium on which a software product that causes the computational resource to carry out the claimed method steps. The software product may be downloadable on the computer readable medium via a network, such as the Internet, using a portable record carrier or marketable in any other manner.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The invention claimed is:

1. A powertrain for a vehicle including a driving shaft configured to rotate with a first rotational speed while exerting a driving torque, said powertrain configured to transmit mechanical energy from the driving shaft to wheels of the vehicle, wherein a controllable clutch is configured to controllably couple an output shaft with the driving shaft, the powertrain further including a control system comprising a controller to control said rotational speed and said driving torque with a drive control signal, said driving torque having a desired driving torque sign, and to control the clutch with a clutch control signal specifying a desired extent of engagement to be provided by the clutch between the driving shaft and the output shaft, the control system comprising a clutch slip indicator to provide a signal indicative for an extent of slip between the driving shaft and the output shaft, wherein the controller has a safety operational mode wherein it controls an engagement of the controllable clutch with a feedback loop in which said desired extent of engagement as specified by the clutch control signal is positively correlated to a difference between said extent of slip as indicated by the slip indicator and a positive reference value for said extent of slip, wherein the slip indicator indicates the extent of slip with a sign that is the product of the sign of the difference between the rotational speed of the driving shaft and a rotational speed of the output shaft and the desired driving torque sign.

2. The powertrain according to claim 1, wherein the controller selectively assumes the safety operational mode upon compliance of at least one enablement condition.

3. The powertrain according to claim 2, wherein the vehicle further comprises a speed indicator to provide a signal indicative for a speed of the vehicle, and wherein the at least one enablement condition is an indication from the speed indicator that an absolute value of the speed of the vehicle is less than or equal to a speed threshold value.

4. The powertrain according to claim 2, wherein the vehicle comprises an acceleration indicator to provide a signal indicative for a measured acceleration of the vehicle, wherein the at least one enablement condition is an indication by the acceleration indicator that the acceleration is inverse a sign of the acceleration.

5. The powertrain according to claim 4, wherein the at least one enablement condition further includes a condition that the acceleration indicator indicates that a magnitude of the acceleration exceeds a threshold magnitude.

6. The powertrain according to claim 5, wherein the threshold magnitude is dependent on the sign of the acceleration as indicated by the acceleration indicator.

7. The powertrain according to claim 6, wherein the threshold magnitude for a positive sign of the acceleration is greater than the threshold magnitude for a negative sign of the acceleration.

8. The powertrain according to claim 4, wherein the vehicle further comprises a speed indicator to provide a signal indicative for a speed of the vehicle, and wherein the at least one enablement condition is an indication from the speed indicator that an absolute value of the speed of the vehicle is greater than or equal to a further speed threshold value.

9. The powertrain according to claim 1, wherein a further controller is provided that monitors whether a rotation direction of a electromotor corresponds to a rotation direction that is required to achieve a desired driving direction and that switches off the electromotor if it is determined that this condition is not complied with.

10. A method of operating a powertrain for a vehicle, the powertrain including a driving shaft configured to rotate with a first rotational speed while exerting a driving torque said powertrain configured to transmit mechanical energy from the driving shaft to wheels of the vehicle, wherein a controllable clutch is configured to controllably couple an output shaft with the driving shaft, the method including a safety operational mode, comprising:
  controlling said rotational speed and said driving torque with a drive control signal, said driving torque having a desired driving torque sign;
  controlling the clutch with a clutch control signal specifying a desired extent of engagement to be provided by the clutch between the driving shaft and the output shaft,
  providing a signal indicative for an extent of slip between the driving shaft and the output shaft, the extent of slip being indicated with a sign that is the product of the sign of the difference between the rotational speed of the driving shaft and a rotational speed of the output shaft and the desired driving torque sign;
  controlling an engagement of the controllable clutch with a feedback loop in which said desired extent of engagement as specified by the clutch control signal is positively correlated to a difference between said extent of slip and a positive reference value for said extent of slip.

11. The method according to claim 10, comprising selectively assuming the safety operational mode upon compliance of at least one enablement condition.

12. The method according to claim 11, further comprising providing a signal indicative for a speed of the vehicle, and wherein the at least one enablement condition is an indication that an absolute value of the speed of the vehicle is less than or equal to a speed threshold value.

13. The method according to claim 11, further comprising providing a signal indicative for a measured acceleration of the vehicle, wherein the at least one enablement condition is an indication by the acceleration indicator that the acceleration is inverse to a sign of the acceleration.

14. The method according to claim 13, wherein the at least one enablement condition further includes a condition that a magnitude of the acceleration exceeding a threshold magnitude is indicated.

15. A non-transitory computer readable medium having a computer program embodied thereon, the computer program including instructions, which when executed by a programmable processor cause the programmable processor to carry out the method of claim 10.

16. The powertrain according to claim 3, wherein the vehicle comprises an acceleration indicator to provide a signal indicative for a measured acceleration of the vehicle, wherein the at least one enablement condition is an indication by the acceleration indicator that the acceleration is inverse to a sign of the acceleration.

17. The powertrain according to claim 5, wherein the vehicle further comprises a speed indicator to provide a signal indicative for a speed of the vehicle, and wherein the at least one enablement condition is an indication from the speed indicator that an absolute value of the speed of the vehicle is greater than or equal to a further speed threshold value.

18. The powertrain according to claim 6, wherein the vehicle further comprises a speed indicator to provide a signal indicative for a speed of the vehicle, and wherein the at least one enablement condition is an indication from the speed indicator that an absolute value of the speed of the vehicle is greater than or equal to a further speed threshold value.

19. The powertrain according to claim 7, wherein the vehicle further comprises a speed indicator to provide a signal indicative for a speed of the vehicle, and wherein the at least one enablement condition is an indication from the speed indicator that an absolute value of the speed of the vehicle is greater than or equal to a further speed threshold value.

20. The powertrain according to claim 16, wherein the vehicle further comprises a speed indicator to provide a signal indicative for a speed of the vehicle, and wherein the at least one enablement condition is an indication from the speed indicator that an absolute value of the speed of the vehicle is greater than or equal to a further speed threshold value.

\* \* \* \* \*